United States Patent
Zhao et al.

(10) Patent No.: US 9,742,514 B2
(45) Date of Patent: Aug. 22, 2017

(54) METHOD, APPARATUS, AND SYSTEM FOR GENERATING TIMESTAMP

(71) Applicant: Huawei Technologies Co., Ltd., Shenzhen, Guangdong (CN)

(72) Inventors: Guodong Zhao, Shenzhen (CN); Bojie Li, Shanghai (CN); Jinfang Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 14/920,514

(22) Filed: Oct. 22, 2015

(65) Prior Publication Data

US 2016/0043823 A1    Feb. 11, 2016

Related U.S. Application Data

(63) Continuation of application No. PCT/CN2014/075803, filed on Apr. 21, 2014.

(30) Foreign Application Priority Data

Apr. 22, 2013  (CN) .......................... 2013 1 0140394

(51) Int. Cl.
    *H04J 3/06* (2006.01)
(52) U.S. Cl.
    CPC ........... *H04J 3/0697* (2013.01); *H04J 3/0667* (2013.01)
(58) Field of Classification Search
    None
    See application file for complete search history.

(56) References Cited

U.S. PATENT DOCUMENTS

| | | | |
|---|---|---|---|
| 2007/0268938 A1 | 11/2007 | Dowd | |
| 2011/0164625 A1* | 7/2011 | Fourcand | H04J 3/0667 370/498 |
| 2012/0082156 A1 | 4/2012 | Swartzentruber et al. | |
| 2013/0039359 A1* | 2/2013 | Bedrosian | H04J 3/0697 370/350 |

(Continued)

FOREIGN PATENT DOCUMENTS

| | | |
|---|---|---|
| CN | 101449520 A | 6/2009 |
| CN | 102195768 A | 9/2011 |
| CN | 102244572 A | 11/2011 |

(Continued)

OTHER PUBLICATIONS

"IEEE Standard for a Precision Clock Synchronization Protocol for Networkded Measurement and Control Systems", IEEE Instrumentation and Measurement Society, IEEE Std 1588, Jul. 24, 2008, 289 pages.

*Primary Examiner* — Hong Cho

(57) ABSTRACT

The present patent application provides a method, an apparatus, and a system for generating a timestamp. The method includes: receiving, by a data packet processing unit, a data packet sent by a physical layer transceiver unit or an upper layer, and identifying whether the data packet is a precise time synchronization protocol PTP data packet, and if the data packet is a PTP data packet, generating, according to a physical layer delay provided by a physical layer delay acquiring unit and a non-physical layer delay provided by a non-physical layer delay acquiring unit, a precise timestamp and rewriting a timestamp field in the data packet.

15 Claims, 6 Drawing Sheets

(56) References Cited

U.S. PATENT DOCUMENTS

2013/0215910 A1* 8/2013 Inomata ............... H04L 7/0008
                                                    370/503

FOREIGN PATENT DOCUMENTS

| CN | 102404103 A | 4/2012 |
| EP | 2 437 416 A2 | 4/2012 |
| WO | WO 2011/109539 A2 | 9/2011 |
| WO | WO 2012/003344 A2 | 1/2012 |

\* cited by examiner

METHOD, APPARATUS, AND SYSTEM FOR GENERATING TIMESTAMP

CROSS-REFERENCE TO RELATED APPLICATIONS

This application is a continuation of International Application No. PCT/CN2014/075803, filed on Apr. 21, 2014, which claims priority to Chinese Patent Application No. 201310140394.6 filed on Apr. 22, 2013, both of which are hereby incorporated by reference in their entireties.

TECHNICAL FIELD

The present patent application relates to communications technologies, and in particular, to a method, an apparatus, and a system for generating a timestamp.

BACKGROUND

With development of communications technologies, communications networks have increasingly high requirements on time synchronization. Existing communications networks' requirements on time synchronization have reached a sub-microsecond level. In the future, large-scale coordinated communication may be applied, and therefore, coordinated communication among multiple cells, multiple antennas, and the like may require time synchronization of a nanosecond level or even a sub-nanosecond level. The IEEE 1588 V2 time synchronization protocol (Precision Time Protocol, PTP for short) implements time synchronization of an entire network by exchanging PTP data packets including a timestamp between communications network nodes, which is a relatively precise time synchronization solution at present.

In the prior art, after receiving a PTP data packet, a communications network node identifies the PTP data packet between a physical layer (Physical, PHY for short) and a media access control (Medium Access Control, MAC for short) layer, and adds a timestamp to the PTP data packet. In a process of adding the timestamp, delay compensation is performed based on a delay of PTP data packet identification. However, the timestamp obtained by using this method has low precision, resulting in low precision of time synchronization of the entire communications network.

SUMMARY

The present patent application provides a method, an apparatus, and a system for generating a timestamp, which are used to prevent a PHY layer processing process from affecting precision of a timestamp when the timestamp is added for a PTP data packet.

A first aspect of the present patent application provides a network node, including: a physical layer transceiver unit, a data packet processing unit, a physical layer delay acquiring unit, and a non-physical layer delay acquiring unit, where the physical layer transceiver unit is configured to send a data packet to the data packet processing unit;

the data packet processing unit is configured to receive the data packet sent by the physical layer transceiver unit or an upper layer, and identify whether the data packet is a precise time synchronization protocol PTP data packet, and if the data packet is a PTP data packet, the data packet processing unit generates, according to physical layer delay information provided by the physical layer delay acquiring unit, and non-physical layer delay information provided by the non-physical layer delay acquiring unit, a precise timestamp and rewrites a timestamp field in the data packet;

the physical layer delay acquiring unit is configured to acquire the physical layer delay information of the data packet that is generated when the data packet passes through the physical layer transceiver unit, and provide the physical layer delay information to the data packet processing unit; and the non-physical layer delay acquiring unit is configured to acquire the non-physical layer delay information between a time point at which the data packet passes through a physical layer-non-physical layer interface and a time point at which the precise timestamp is generated in the data packet processing unit, and provides the non-physical layer delay information to the data packet processing unit.

With reference to the first aspect of the present patent application, in a first possible implementation manner, the data packet processing unit includes a data packet identification subunit and a timestamp generating and rewriting subunit, where the data packet identification subunit is configured to receive the data packet sent by the physical layer transceiver unit or the upper layer, and identify whether the data packet is a precise time synchronization protocol PTP data packet; and the timestamp generating and rewriting subunit is configured to generate, according to the physical layer delay acquiring unit and the non-physical layer delay acquiring unit, the precise timestamp and rewrite the timestamp field in the data packet when the data packet identification subunit identifies that the data packet is a precise time synchronization protocol PTP data packet.

With reference to the first possible implementation manner of the first aspect of the present patent application, in a second possible implementation manner, the data packet identification subunit receives the data packet sent by the upper layer, and in this case, the physical layer delay information of the data packet that is generated when the data packet passes through the physical layer transceiver unit and is acquired by the physical layer delay acquiring unit is historical physical layer delay information, and a non-physical layer delay that is acquired by the non-physical layer delay acquiring unit and is between the time point at which the data packet passes through the physical layer-non-physical layer interface and the time point at which the precise timestamp is generated in the data packet processing unit is historical non-physical layer delay information, where the historical physical layer delay information is physical layer delay information of a data packet transmitted prior to the data packet, and the historical non-physical layer delay information is non-physical layer delay information of a data packet transmitted prior to the data packet; and the timestamp generating and rewriting subunit is configured to predict and generate, according to the historical physical layer delay information acquired by the physical layer delay acquiring unit and the historical non-physical layer delay information acquired by the non-physical layer delay acquiring unit, the precise timestamp and rewrite the timestamp field in the data packet.

With reference to the first aspect and the first two possible implementation manners of the first aspect of the present patent application, in a third possible implementation manner, the physical layer delay information of the data packet that is generated when the data packet passes through the physical layer transceiver unit and is acquired by the physical layer delay acquiring unit includes at least one of the following types of delay information: fixed delay information, information about a dynamic fine-grained delay caused by a mismatch between a recovery clock and a local clock, code group alignment delay information, storage module read/write delay information, and data rate matching module delay information.

With reference to the first aspect and the first two possible implementation manners of the first aspect of the present patent application, in a fourth possible implementation manner, the non-physical layer delay information that is acquired by the non-physical layer delay acquiring unit and is between the time point at which the data packet passes through the physical layer-non-physical layer interface and the time point at which the timestamp is generated in the data packet processing unit includes at least one of the following types of delay information of the data packet at a non-physical layer: processing delay information, queue delay information, and information about a phase difference delay caused by a clock domain difference.

With reference to the first aspect and the first four possible implementation manners of the first aspect of the present patent application, in a fifth possible implementation manner, the data packet processing unit is located in a MAC layer or a queue area connected to the MAC.

A second aspect of the present patent application provides a method for generating a timestamp, including:

receiving, by a network node, a data packet sent by another network node or a data packet sent by an upper layer of the network node;

acquiring, by the network node, physical layer delay information and non-physical layer delay information of the data packet; and identifying, by the network node, whether the data packet is a precise time synchronization protocol PTP data packet, and if the data packet is a PTP data packet, generating, according to the physical layer delay and the non-physical layer delay, a precise timestamp and rewriting a timestamp field in the data packet.

With reference to the second aspect of the present patent application, in a first possible implementation manner, the receiving, by a network node, a data packet sent by another network node or receiving a data packet sent by an upper layer of the network node includes:

receiving, by the network node, the data packet sent by the upper layer, where the physical layer delay information of the data packet acquired by the network node is historical physical layer delay information, and the non-physical layer delay information that is acquired by the network node and is between a time point at which the data packet passes through a physical layer-non-physical layer interface and a time point at which the precise timestamp is generated in the network node is historical non-physical layer delay information, where the historical physical layer delay information is physical layer delay information of a data packet transmitted prior to the data packet, and the historical non-physical layer delay information is non-physical layer delay information of a data packet transmitted prior to the data packet; and correspondingly, the generating, by the network node according to the physical layer delay and the non-physical layer delay, a precise timestamp and rewriting a timestamp field in the data packet includes: predicting and generating, according to the historical physical layer delay information and the historical non-physical layer delay information, the precise timestamp and rewriting the timestamp field in the data packet.

With reference to the second aspect and the first possible implementation manner of the second aspect of the present patent application, in a second possible implementation manner, the physical layer delay information includes at least one of the following types of delay information: fixed delay information, information about a dynamic fine-grained delay caused by a mismatch between a recovery clock and a local clock, code group alignment delay information, storage module read/write delay information, and data rate matching module delay information; and the non-physical layer delay information is delay information between the time point at which the data packet passes through the physical layer-non-physical layer interface and the time point at which the precise timestamp is generated in the network node, and includes at least one of the following types of delay information of the data packet at a non-physical layer: processing delay information, queue delay information, and information about a phase difference delay caused by a clock domain difference.

A third aspect of the present patent application provides a communications system, including the network node according to the foregoing first aspect and any one of the possible implementation manners of the first aspect.

According to the method, the apparatus, and the system for generating a timestamp that are provided in the embodiments, a physical layer transceiver unit receives a data packet from a data packet processing unit and sends the data packet to another network node; or receives a data packet from another network node and sends the data packet to a data packet processing unit; a physical layer delay acquiring unit acquires physical layer delay information of the data packet that is generated when the data packet passes through the physical layer transceiver unit, and provides the physical layer delay information to the data packet processing unit; a non-physical layer delay acquiring unit acquires non-physical layer delay information between a time point at which the data packet passes through a physical layer-non-physical layer interface and a time point at which a precise timestamp is generated in the data packet processing unit, and provides the non-physical layer delay information to the data packet processing unit. The data packet processing unit also receives a data packet sent by the physical layer transceiver unit or an upper layer, and identifies whether the data packet is a precise time synchronization protocol PTP data packet, and if the data packet is a PTP data packet, the data packet processing unit generates, according to the physical layer delay acquiring unit and the non-physical layer delay acquiring unit, a precise timestamp and rewrites a timestamp field in the data packet, so that compensation for a timestamp is implemented according to the physical layer delay information and the non-physical layer delay information, which effectively improves precision of the timestamp, and improves time synchronization precision of an entire communications network.

BRIEF DESCRIPTION OF THE DRAWINGS

To describe the technical solutions in the embodiments of the present patent application more clearly, the following briefly introduces the accompanying drawings required for describing the embodiments. Apparently, the accompanying drawings in the following description show some embodiments of the present patent application, and a person of ordinary skill in the art may still derive other drawings from these accompanying drawings without creative efforts.

DETAILED DESCRIPTION

To make the objectives, technical solutions, and advantages of the embodiments of the present patent application clearer, the following clearly describes the technical solutions in the embodiments of the present patent application with reference to the accompanying drawings in the embodiments of the present patent application. Apparently, the described embodiments are some rather than all of the embodiments of the present patent application. All other embodiments obtained by a person of ordinary skill in the art based on the embodiments of the present patent application without creative efforts shall fall within the protection scope of the present patent application.

Figure 1:
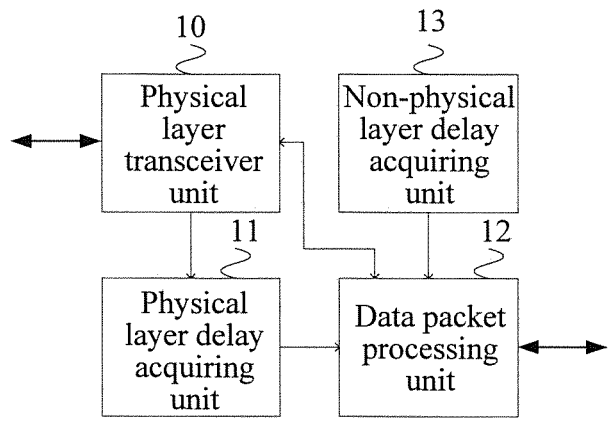
FIG. 1 is a schematic structural diagram of a network node according to Embodiment 1 of the present patent application.

FIG. 1 is a schematic structural diagram of a network node according to Embodiment 1 of the present patent application. As shown in FIG. 1, the network node includes: a physical layer transceiver unit 10, a data packet processing unit 12, a physical layer delay acquiring unit 11, and a non-physical layer delay acquiring unit 13.

The physical layer transceiver unit 10 is configured to send a data packet to the data packet processing unit.

Specifically, the physical layer transceiver unit 10 is configured to receive a data packet from the data packet processing unit 12 and send the data packet to another network node; or, the physical layer transceiver unit 10 is configured to receive a data packet from another network node and send the data packet to the data packet processing unit 12.

The data packet processing unit 12 is configured to receive the data packet sent by the physical layer transceiver unit 10 or an upper layer, and identify whether the data packet is a precise time synchronization protocol PTP data packet, and if the data packet is a PTP data packet, the data packet processing unit 12 generates, according to the physical layer delay acquiring unit 11 and the non-physical layer delay acquiring unit 13, a precise timestamp and rewrites a timestamp field in the data packet.

The physical layer delay acquiring unit 11 is configured to acquire physical layer delay information of the data packet that is generated when the data packet passes through the physical layer transceiver unit 10, and provide the physical layer delay information to the data packet processing unit 12.

The non-physical layer delay acquiring unit 13 is configured to acquire non-physical layer delay information between a time point at which the data packet passes through a physical layer-non-physical layer interface and a time point at which the precise timestamp is generated in the data packet processing unit 12, and provides the non-physical layer delay information to the data packet processing unit 12.

Referring to FIG. 1, the physical layer transceiver unit 10 and the data packet processing unit 12 may be connected by using an existing media independent interface (Media Independent Interface, MII for short), that is, a physical layer-non-physical layer interface. The physical layer transceiver unit 10 transfers the data packet from a physical layer to the data packet processing unit 12, or receives the data packet sent by an upper layer. For example, the upper layer may be a media access control (Media Access Control, MAC for short) layer, an operation (Operating System, OS for short) layer, or an application layer of the network node. The physical layer delay acquiring unit 11 may be connected to the data packet processing unit 12 by using the independent physical layer-non-physical layer interface, and the physical layer delay information of the data packet that is in the physical layer transceiver unit 10 and is acquired by the physical layer delay acquiring unit 11 is transmitted to the data packet processing unit 12 through the independent physical layer-non-physical layer interface. It should be noted that, the independent physical layer-non-physical layer interface may cooperate with and be compatible with an original MII interface that is configured to transmit a data packet, and data transmitted through the physical layer-non-physical layer interface and data transmitted through the MII are synchronized with a local clock of the network node, which implements synchronization of the data transmitted through the physical layer-non-physical layer interface and the data transmitted through the MII interface. In this way, interface connection line resources are saved, and delay information transmission between the physical layer and the MAC layer is implemented at a lower cost.

The data packet processing unit 12 and the non-physical layer delay acquiring unit 13 may be disposed between the physical layer and the MAC layer, or disposed at the MAC layer. The data packet processing unit 12 receives the physical layer delay information sent by the physical layer delay acquiring unit 11, and also receives the non-physical layer delay information sent by the non-physical layer delay acquiring unit 13; therefore, the data packet processing unit 12 performs delay compensation for the PTP data packet and generates a precise timestamp according to both the physical layer delay information and the non-physical layer delay information. It should be noted that, data packets received by the physical layer transceiver unit 10 are all Ethernet data packets; therefore, the physical layer delay information acquired by the physical layer delay acquiring unit 11 is physical layer delay information of the Ethernet data packets; only when the data packet processing unit 12 identifies that one of the multiple Ethernet data packets is a PTP data packet, the data packet processing unit 12 generates a precise timestamp according to the determined PTP data packet and the physical layer delay information and the non-physical layer delay information that are corresponding to the PTP data packet, and performs delay compensation for the PTP data packet.

In addition, in an implementation scenario in which the network node serves as a sending node, the network node needs to provide a data packet processed at an upper layer, such as a MAC layer, to another network node by using a physical layer. Before the physical layer sends the data packet, if the data packet processing unit 12 identifies that an Ethernet data packet is a PTP data packet, the network node needs to add a timestamp to the PTP data packet. In another implementation scenario in which the network node serves as a receiving node, the network node receives Ethernet data packets sent by other network nodes. These Ethernet data packets are first processed at a physical layer of the network node, and then further processed at another upper layer, such as a MAC layer, of the network node. After being processed at the physical layer, these Ethernet data packets are identified by the data packet processing unit 12; if one of the Ethernet data packets is identified as a PTP data packet, a timestamp needs to be added to the PTP data packet.

In addition, the foregoing physical layer transceiver unit 10, the physical layer delay acquiring unit 11, the data packet processing unit 12, and the non-physical layer delay acquiring unit 13 are synchronized by using the local clock of the network node.

In the network node according to this embodiment, a physical layer transceiver unit receives a data packet from a data packet processing unit and sends the data packet to another network node; or receives a data packet from another network node and sends the data packet to a data packet processing unit; a physical layer delay acquiring unit acquires physical layer delay information of the data packet that is generated when the data packet passes through the physical layer transceiver unit, and provides the physical layer delay information to the data packet processing unit; a non-physical layer delay acquiring unit acquires non-physical layer delay information between a time point at which the data packet passes through a physical layer-non-physical layer interface and a time point at which a precise timestamp is generated in the data packet processing unit, and provides the non-physical layer delay information to the data packet processing unit; the data packet processing unit also receives a data packet sent by the physical layer transceiver unit or an upper layer, and identifies whether the data packet is a precise time synchronization protocol PTP data packet, and if the data packet is a PTP data packet, the data packet processing unit generates, according to the physical layer delay acquiring unit and the non-physical layer delay acquiring unit, a precise timestamp and rewrites a timestamp field in the data packet, so that compensation for a timestamp is implemented according to the physical layer delay information and the non-physical layer delay information, which effectively improves precision of the timestamp, and improves time synchronization precision of an entire communications network.

Figure 2:
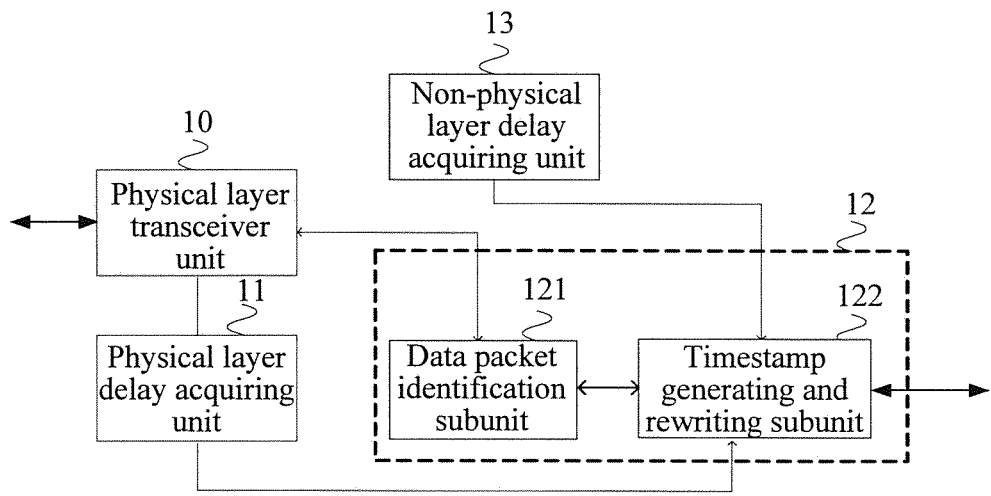
FIG. 2 is a schematic structural diagram of a network node according to Embodiment 2 of the present patent application.

Further, on the basis of the network node provided in FIG. 1, FIG. 2 is schematic structural diagram of a network node according to Embodiment 2 of the present patent application. As shown in FIG. 2, the data packet processing unit 12 includes: a data packet identification subunit 121 and a timestamp generating and rewriting subunit 122.

The data packet identification subunit 121 is configured to receive a data packet sent by the physical layer transceiver unit 10 or an upper layer, and identify whether the data packet is a precise time synchronization protocol PTP data packet.

If the data packet is a PTP data packet, the timestamp generating and rewriting subunit 122 generates, according to the physical layer delay acquiring unit 11 and the non-physical layer delay acquiring unit 13, a precise timestamp and rewrites a timestamp field in the data packet.

The following separately uses that the network node serves as a receiving node and that the network node serves as a sending node for description.

Figure 3:
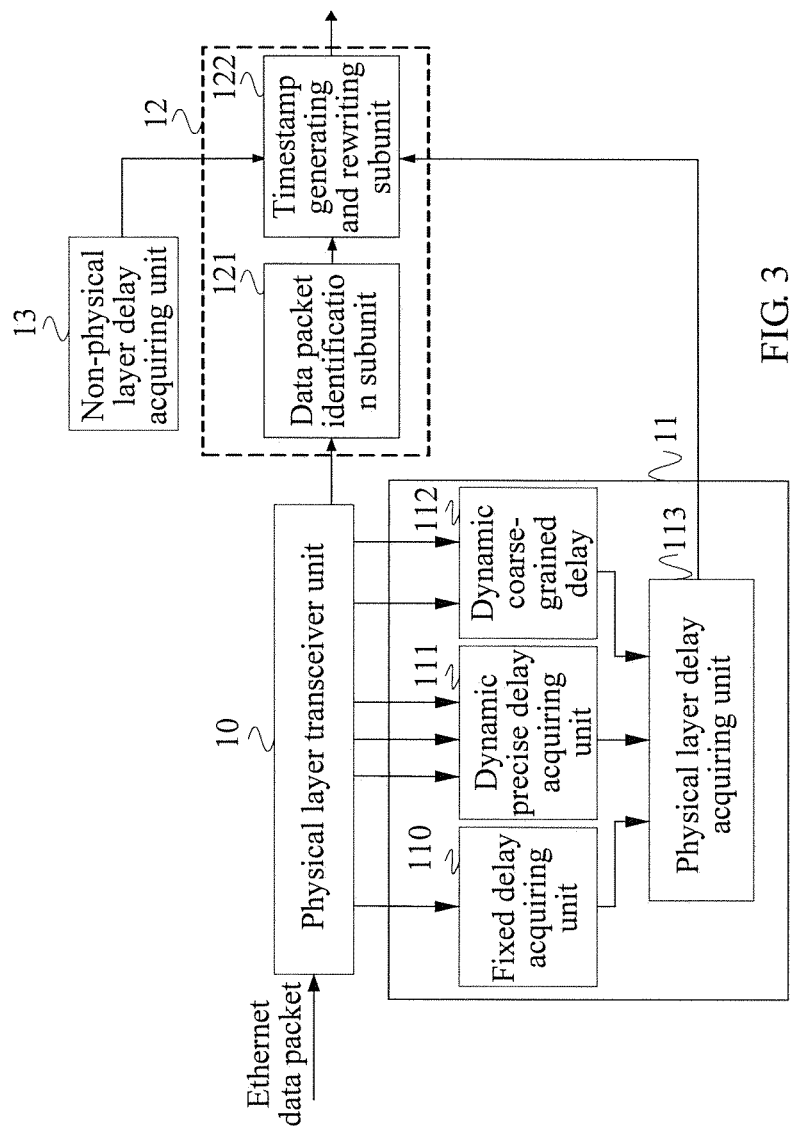
FIG. 3 is a schematic diagram of a working principle of a network node according to Embodiment 2 of the present patent application.

When the network node serves as a receiving node, and receives an Ethernet data packet sent by another network node, a direction of the data packet is from a physical layer of the network node to an upper layer, such as a MAC layer, of the network node. FIG. 3 is a schematic diagram of a working principle of a network node according to Embodiment 2 of the present patent application. As shown in FIG. 3, a data packet received by the physical layer transceiver unit 10 is sent by another network node on a network, and the physical layer delay information acquired by the physical layer delay acquiring unit 11 includes: delay information of each piece of data in the data packet received by the physical layer transceiver unit 10. As shown in FIG. 3, the physical layer delay acquiring unit 11 specifically includes: a fixed delay acquiring unit 110, a dynamic precise delay acquiring unit 111, a dynamic coarse-grained delay acquiring unit 112, and a physical layer delay acquiring subunit 113, where the fixed delay acquiring unit 110 is configured to acquire fixed delay information generated by a related module in the physical layer transceiver unit 10; the dynamic precise delay acquiring unit 111 is configured to acquire dynamic precise delay information generated by a related module in the physical layer transceiver unit 10; the dynamic coarse-grained delay acquiring unit 112 is configured to acquire dynamic coarse-grained delay information generated by a related module in the physical layer transceiver unit 10. The physical layer delay acquiring subunit 113 receives the foregoing fixed delay information, the foregoing dynamic precise delay information, and the foregoing dynamic coarse-grained delay information, and combines them into the physical layer delay information, and provides the physical layer delay information to the timestamp generating and rewriting subunit 122. The timestamp generating and rewriting subunit 122 may generate a precise timestamp of the PTP data packet according to PTP acknowledgement indication information provided by the data packet identifying subunit 121 and the physical layer delay information and the non-physical layer delay information that are received by the timestamp generating and rewriting subunit 122. The fixed delay information, the dynamic precise delay information, and the dynamic coarse-grained delay information are described in detail in the following embodiment, and details are not described herein.

Figure 4:
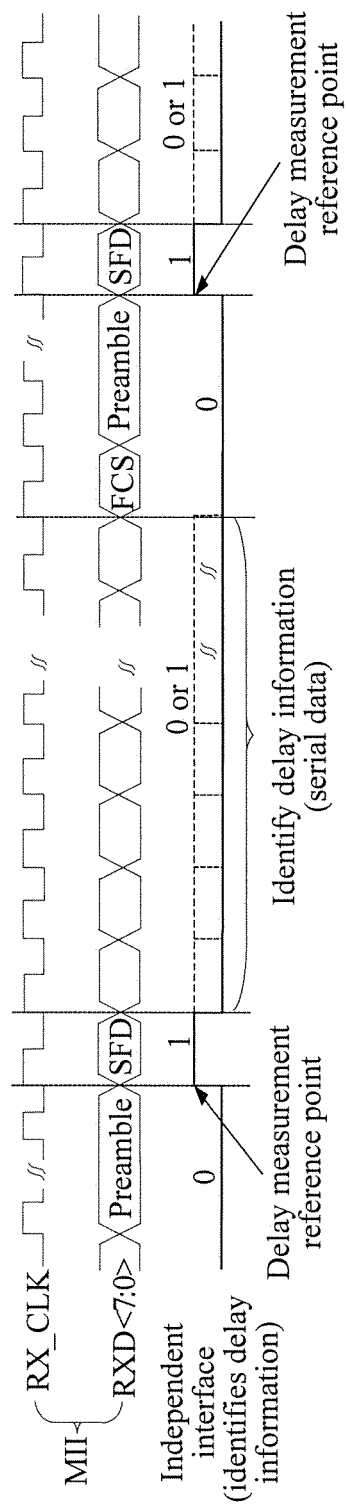
FIG. 4 is a schematic diagram of an interface application of a network node according to Embodiment 2 of the present patent application.

Specifically, FIG. 4 is a schematic diagram of an interface application of a network node according to Embodiment 2 of the present patent application. As shown in FIG. 4, an independent interface is an interface that transmits physical layer delay information between a physical layer and a non-physical layer, and the independent physical layer-non-physical layer interface may be implemented in a relatively simple manner. For example, in cooperation with MII interface data, the independent physical layer-non-physical layer interface may be implemented by using a data line. As shown in FIG. 4, MII interface data related to the present patent application includes: RX_CLK, which represents a receiving clock, and RXD (receive data), which represents receiving data, where SFD (Start Frame Delimiter) represents a start of a frame, FCS (Frame Check Sequence) represents frame check located in an end of the frame, and Preamble is a preamble signal used to assist in receiving data at a PHY layer.

Further, referring to FIG. 3, when the network node serves as a receiving node and receives an Ethernet data packet sent by another network node, the network node performs, by using the non-physical layer delay acquiring unit 13, real-time measurement on delay information of a start point of each frame in the Ethernet data packet to obtain physical layer delay information; the physical layer delay information is provided, in a form of 1-bit serial delay data, to the timestamp generating and rewriting subunit 122 of the non-physical layer by using the independent physical layer-non-physical layer interface. The serial delay data and the MII interface data are aligned with a clock, where physical layer delay information corresponding to the SFD is a bit "1", which indicates a start of physical layer delay information corresponding to each data frame; a bit "0" or "1" corresponding to data indicates data of receiving delay information from the Start Frame Delimiter (SFD) of the local data frame; physical layer delay information corresponding to the FCS and the Preamble are bits "0", which indicate an end of the physical layer delay information of the local frame. This interface design only requires one physical data line, and is compatible with the MII interface standard or the 10 Gbps Ethernet Attachment Unit Interface (10 Gbps Ethernet Attachment Unit Interface, XAUI interface for short) standard, which saves interface connection line resources, and implements delay information transmission from a physical layer to an upper layer, such as the MAC layer, at a lower cost. Further, because physical layer delay information of the independent physical layer-non-physical layer interface and data of the MII interface are aligned with a clock, the physical layer transceiver unit 10 may instruct, according to a correspondence between a data packet and physical layer delay information in each clock period, the timestamp generating and rewriting subunit 122 to generate a precise timestamp of the data packet according to PTP acknowledgement indication information provided by the data packet identification subunit 121 and the physical layer delay information and the non-physical layer delay information that are received by the timestamp generating and rewriting subunit 122. Specifically, the data packet identification subunit 121 determines whether each Ethernet data packet is a PTP data packet, and the determining process generates a dynamic delay. Regardless of whether each Ethernet data packet is a PTP data packet, the physical layer delay acquiring unit 11 calculates physical layer delay information of each Ethernet data packet, the non-physical layer delay acquiring unit 13 acquires non-physical layer delay information between a time point at which the Ethernet data packet passes through the physical layer-non-physical layer interface and a time point at which a precise timestamp is generated in the data packet processing unit 12, and the timestamp generating and rewriting subunit 122 combines the physical layer delay information sent by the physical layer and the non-physical layer delay information to obtain total delay information. When it is determined that an Ethernet data packet is a PTP data packet, the data packet identification subunit 121 sends trigger information to the timestamp generating and rewriting subunit 122, and the timestamp generating and rewriting subunit 122 reads corresponding total delay information by using the trigger information, and uses the total delay information as a timestamp reference for generating a timestamp. If it is determined that an Ethernet data packet is not a PTP data packet, the timestamp generating and rewriting subunit 122 does not use the acquired total delay information. For example, an Ethernet data packet in the sixth period is a PTP data packet, and therefore, receiving delay information in the sixth period is physical layer delay information of the PTP data packet, and finally a timestamp generating unit generates a precise timestamp of the PTP data packet according to the physical layer delay information and the non-physical layer delay information of the PTP data packet.

When the network node serves as a sending node and sends a data packet to another network node, a data packet direction is from an upper layer of the network node, such as an MAC layer, to a physical layer. Referring to FIG. 2, the data packet identification subunit 121 receives the data packet sent by the upper layer, the physical layer delay information of the data packet that is generated when the data packet passes through the physical layer transceiver unit 10 and is acquired by the physical layer delay acquiring unit 11 is historical physical layer delay information, and the non-physical layer delay that is acquired by the non-physical layer delay acquiring unit 13 and is between the time point at which the data packet passes through the physical layer-non-physical layer interface and the time point at which the precise timestamp is generated in the data packet processing unit 12 is historical non-physical layer delay information; the timestamp generating and rewriting subunit 122 predicts and generates, according to the historical physical layer delay information acquired by the physical layer delay acquiring unit 11 and the historical non-physical layer delay information acquired by the non-physical layer delay acquiring unit 13, a precise timestamp and rewrites a timestamp field in the data packet.

The historical physical layer delay information is physical layer delay information of a data packet transmitted prior to the data packet; the non-physical layer delay information is non-physical layer delay information of a data packet transmitted prior to the data packet.

Figure 5:
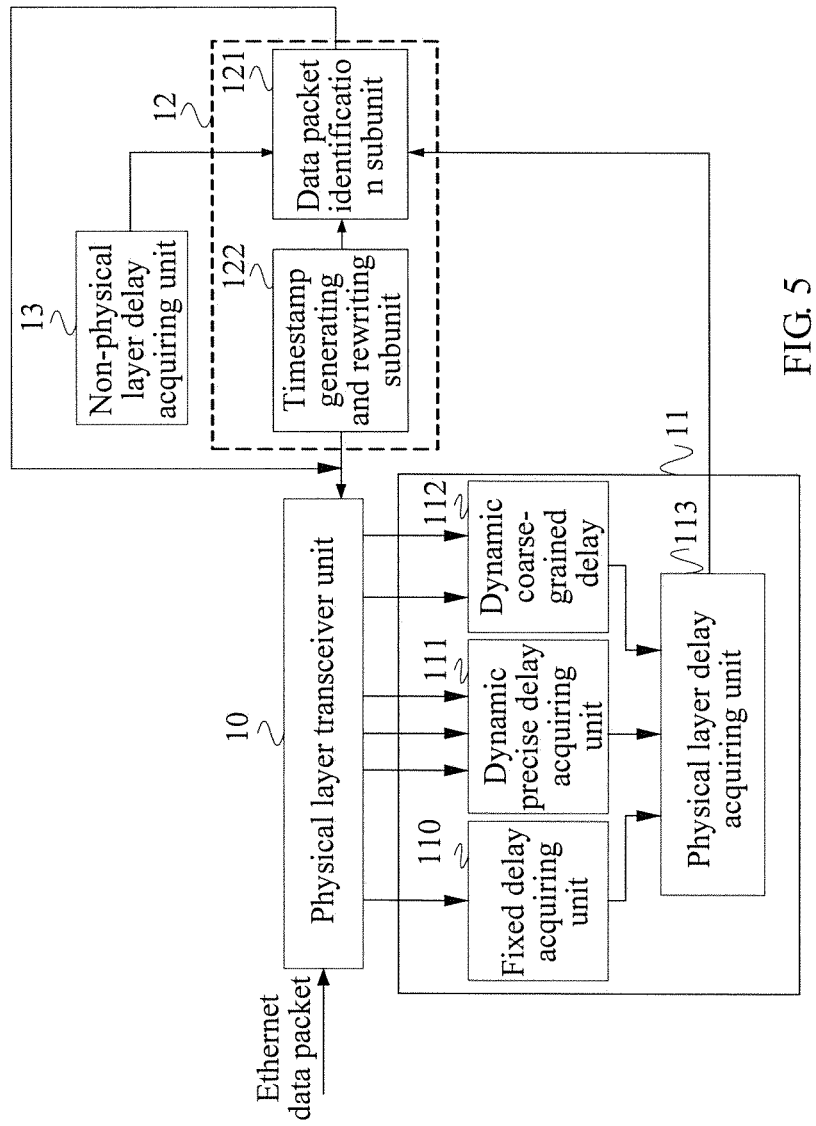
FIG. 5 is a schematic diagram of a working principle of a network node according to Embodiment 3 of the present patent application.

Specifically, FIG. 5 is a schematic diagram of a working principle of a network node according to Embodiment 3 of the present patent application. As shown in FIG. 5, a data packet received by a physical layer transceiver unit 10 at a physical layer is sent by a MAC layer. Similar to FIG. 2, a physical layer delay acquiring unit 11 specifically includes: a fixed delay acquiring unit 110, a dynamic precise delay acquiring unit 111, a dynamic coarse-grained delay acquiring unit 112, and a physical layer delay acquiring subunit 113. Functions of the foregoing units are also similar to functions in Embodiment 2, and details are not described herein again. Physical layer delay information acquired by the physical layer delay acquiring unit 11 includes: delay information of each piece of data in the data packet received by physical layer transceiver unit 10.

The data packet received by the physical layer transceiver unit 10 at the physical layer is sent by an upper layer, such as the MAC layer, of the network node; in this case, a timestamp generating and rewriting subunit 122 is specifically configured to: the physical layer delay acquiring unit 11 calculates physical layer delay information of each Ethernet data packet, a non-physical layer delay acquiring unit 13 acquires non-physical layer delay information between a time point at which the Ethernet data packet passes through a physical layer-non-physical layer interface and a time point at which a precise timestamp is generated in a data packet processing unit 12, and the timestamp generating and rewriting subunit 122 combines the physical layer delay information sent by the physical layer and the non-physical layer delay information. It should be noted that in this embodiment, the physical layer delay information is historical physical layer delay information, and the non-physical layer delay information is historical non-physical layer delay information. A PTP data packet that carries a timestamp is provided to the physical layer transceiver unit 10, and is finally provided to another network node by using the physical layer.

Specifically, for example, the network node sends 10 data packets to other network nodes, where the sixth data packet is a PTP data packet. When a data packet identification subunit 121 performs identification on the PTP data packet, the first five data packets have been provided by the MAC layer to the physical layer transceiver unit 10. At this time, the physical layer delay acquiring unit 11 may acquire physical layer delay information according to the foregoing five data packets, and provide the physical layer delay information to the timestamp generating and rewriting subunit 122. The timestamp generating and rewriting subunit 122 receives non-physical layer delay information of the PTP data packet acquired by the non-physical layer delay acquiring unit 13 and the physical layer delay information. Further, the timestamp generating and rewriting subunit 122 generates a precise timestamp of the PTP data packet according to delay information (that is, historical physical layer delay information) of a data packet transmitted prior to the PTP data packet and non-physical layer delay information (that is, historical non-physical layer delay information) of a data packet transmitted prior to the PTP data packet.

The physical layer transceiver unit 10 of the network node includes a PMA subunit and a PCS subunit, where the PMA subunit includes modules such as an input buffer (input buffer), an equalizer (Equalizer), a gain controller (Gain Controller), a clock and data recoverer (CDR), and a deserializer (Deserializer), and the PCS subunit includes modules such as a word aligner (Word Aligner), a rate-match FIFO (Rate-Match FIFO), a decoder (for example, 10B/8B decoder or 66B/64B decoder), and a phase compensation FIFO (Phase Compensation FIFO). The physical layer delay acquiring unit 11 calculates a fixed delay, a dynamic coarse-grained delay, and a dynamic fine-grained delay of the PMA subunit and the PCS subunit at the physical layer according to delay indication information provided by the physical layer transceiver unit 10, and provides, by using an independent physical layer-non-physical layer interface (Interface), the physical layer delay information to the timestamp generating and rewriting subunit 122 for calculating a precise delay and generating a precise timestamp, and the timestamp generating and rewriting subunit 122 writes the generated precise timestamp to the PTP data packet. First, the data packet identification subunit 121 performs identification on the PTP data packet. At the same time, the non-physical layer delay acquiring unit 13 acquires non-physical layer delay information between a time point at which the data packet passes through a physical layer-non-physical layer interface and a time point at which the precise timestamp is generated in the data packet processing unit 12, and provides the non-physical layer delay information to the timestamp generating and rewriting subunit 122 in the data packet processing unit 12, and identifies a location of timestamp information in the PTP data packet. When the data packet is identified as a PTP data packet, the timestamp generating and rewriting subunit 122 generates a timestamp according to physical layer delay information (that is, the historical physical layer delay information) provided by the independent physical layer-non-physical layer interface (Interface), and non-physical layer delay information (that is, the historical non-physical layer delay information) calculated and measured by the non-physical layer delay acquiring unit 13, and a timestamp generating unit 14 writes the generated timestamp into the corresponding PTP data packet.

For a scenario in which the network node serves as a sending node, delay information of a data packet transmitted prior to a PTP data packet is: delay information of a last data packet transmitted prior to the PTP data packet, or information about an average delay of all data packets transmitted prior to the PTP data packet. It should be noted that, a delay generated by a data packet transmitted prior to the PTP data packet when the data packet passes through the physical layer transceiver unit 10 has smoothness, that is, there is a relatively slight difference between delays corresponding to different data packets. Therefore, physical layer delay information of the PTP data packet may be acquired according to delay information of the data packet transmitted prior to the PTP data packet, that is, the historical physical layer delay information. Specifically, the physical layer delay information of the PTP data packet may be acquired by using two types of information: delay information of a last data packet transmitted prior to the PTP data packet; or, information about an average delay of all data packets transmitted prior to the PTP data packet. Similarly, in a scenario in which the network node serves as a sending node, the non-physical layer delay acquiring unit 13 acquires non-physical layer delay information between a time point at which a data packet passes through a physical layer-non-physical layer interface and a time point at which a precise timestamp is generated in the data packet processing unit 12, or may acquire non-physical layer delay information of a data packet transmitted prior to the PTP data packet, that is, the historical non-physical layer delay information.

Further, referring to FIG. 1, FIG. 2 and FIG. 5, it should be noted that, before an upper layer, such as a MAC layer, of the network node sends a data packet, the data packet identification unit 12 first performs PTP data packet identification processing and determines a location of timestamp information. At the same time, the non-physical layer delay acquiring unit 13 acquires non-physical layer delay information between a time point at which the data packet passes through a physical layer-non-physical layer interface and a time point at which the precise timestamp is generated in the data packet processing unit 12, and provides the non-physical layer delay information to the timestamp generating and rewriting subunit 122 in the data packet processing unit 12. Receiving delay information of the physical layer is predicted and calculated by the physical layer delay acquiring unit 11 according to the physical layer delay information (that is, the historical physical layer delay information) provided by the physical layer transceiver unit 10, and is provided to the timestamp generating and rewriting subunit 122 by using the independent physical layer-non-physical layer interface. When the data packet identification unit 12 determines that the data packet is a PTP data packet, the timestamp generating and rewriting subunit 122 generates the precise timestamp according to the physical layer delay information acquired by the physical layer delay acquiring unit 11 and the non-physical layer delay information calculated and measured by the non-physical layer delay acquiring unit 13, and the timestamp generating and rewriting subunit 122 writes the generated precise timestamp into the corresponding PTP data packet.

In the foregoing embodiments, the physical layer delay information that is acquired by the physical layer delay acquiring unit 11 and is of the data packet in the physical layer transceiver unit 10 includes at least one of the following types of delay information: fixed delay information, information about a dynamic fine-grained delay caused by a mismatch between a recovery clock and a local clock, code group alignment delay info nation, storage module read/write delay information, and data rate matching module delay information.

Generally, the foregoing delay information is obtained in a process in which the data packet is processed on a physical layer channel.

It should be noted that, a delay generated at the physical layer may include a fixed delay, a dynamic coarse-grained delay, and a dynamic fine-grained delay.

The fixed delay information refers to a delay that is relatively fixed, a delay that does not change with time, or a delay whose change may be ignored in a processing process of the physical layer transceiver unit 10 of the network node. For example, a fixed delay caused when a received signal enters an input buffer of a component, and a fixed processing clock periodical delay caused by a signal that undergoes an operation of fixed-length multiply-add equalization filtering. The fixed delay information may be obtained directly according to device characteristics or parameters of a module at the physical layer, for example, a fixed-tap equalizer and a 10B/8B decoder, or the fixed delay information may be obtained by means of delay simulation using a simulation tool or may be directly obtained by means of measurement. For example, for an input buffer (Input Buffer), the fixed delay information may be acquired by querying hardware parameters or delay simulation information.

The dynamic coarse-grained delay includes: storage module read/write delay information and data rate matching module delay information. The dynamic coarse-grained delay refers to that a quantity of periods of an integer multiple processing clock (such as 125 MHz) used in a signal processing process is not fixed, but dynamically changed, for example, a non-fixed integer multiple clock period delay caused by a first in first out buffer (FIFO Buffer) read/write operation in the signal processing process, that is, storage module read/write delay information, and a non-fixed integer multiple processing clock period delay caused by a mismatch between receiving and sending data rates, that is, data rate matching module delay information, and the like. In addition, the dynamic coarse-grained delay may be calculated by using dynamic adjustment information output by each module that introduces a dynamic delay at the physical layer. For example, idle (IDLE) fields are sent at intervals between adjacent data packets over the MII interface, to perform padding; a Rate Match module in a transceiver channel adds or deletes some IDLE fields according to a data rate, which causes the dynamic coarse-grained delay (integer period).

The dynamic precise delay is caused by a phase difference of different clocks used by a transceiver channel module, and specifically refers to a fine delay that is less than one clock processing period and caused by a mismatch between processing clock rates or phases. For example, a dynamic fractional multiple clock period delay caused by random bit slip introduced by a word alignment (Word Alignment) operation, that is, serial data slip delay information. Processing clocks of some transceiver modules at the physical layer use a clock and data recovery (Clock and Data Recovery, CDR for short) recovery clock (Recover Clock), and processing clocks of some transceiver modules at the physical layer use a local clock (Local Clock), so that a mismatch between the two clocks is caused. When the CDR recovery clock is used to perform an FIFO data write operation, and the local clock is used to perform an FIFO data read operation, read data and written data have non-fixed phase differences, and the phase differences generally include a dynamic delay less than one clock processing period (such as a processing clock 125 MHz whose period is 8 ns), that is, dynamic fine-grained delay information caused by a mismatch between the recovery clock and the local clock. Specifically, the dynamic fine-grained delay may be measured by using a BangBang phase detector or a dual mixer time difference (Dual Mixer Time Difference, DMTD for short) phase detecting method. The dynamic fine-grained delay may be obtained by means of phase detecting calculation by using an asynchronous clock that generates a dynamic delay, or the delay is calculated by using slip indication information output by a word align (Word Align) module when the word align module generates bit slip.

Further, the physical layer delay information is indicated by serial data including 32 bits, where the 16 most significant bits of the 32 bits are used to indicate fixed delay information, storage module read/write delay information, and data rate matching module delay information, and the 16 least significant bits of the 32 bits are used to indicate dynamic fine-grained delay information and serial data slip delay information caused by a mismatch between the recovery clock and the local clock. In addition, the 16 most significant bits of the 32 bits are used to indicate an integer multiple nanosecond (ns) part of the delay information, and the 16 least significant bits of the 32 bits are used to indicate an integer multiple picoseconds (ps) part of the delay information. For example, delay information 8.001 ns may be represented as (0000_0000_0000_1000_0000_0000_0000_0001) 2.

Further, the delay information that is acquired by the non-physical layer delay acquiring unit 13 and is between the time point at which the data packet passes through the physical layer-non-physical layer interface and the time point at which the timestamp is generated in the data packet processing unit 12, that is, the non-physical layer delay information includes at least one of the following types of delay information: processing delay information, queue delay information, information about a phase delay caused by a clock domain difference.

It should be noted that, for the foregoing embodiments, the data packet processing unit 12 is located at a MAC layer or a queue area connected to the MAC, where the queue area connected to the MAC is a buffer register operation area, such as a buffer or a register in the network node, that is connected to the MAC.

The network node described in the foregoing embodiments may be applied to various communications systems that use the 1588 protocol for time synchronization, for example, an existing 2G or 3G communications system, and a next generation communications system, for example, a global system for mobile communications (GSM, Global System for Mobile communications), a code division multiple access (CDMA, Code Division Multiple Access) system, a time division multiple access (TDMA, Time Division Multiple Access) system, a wideband code division multiple access (WCDMA, Wideband Code Division Multiple Access Wireless) system, a frequency division multiple addressing (FDMA, Frequency Division Multiple Addressing) system, an orthogonal frequency-division multiple access (OFDMA, Orthogonal Frequency-Division Multiple Access) system, a single carrier FDMA (SC-FDMA) system, a general packet radio service (GPRS, General Packet Radio Service) system, a long term evolution (LTE, Long Term Evolution) system, and other like communications systems, or industrial control systems that require precise time synchronization, and fields of traffic control system time synchronization, precise time synchronization in radar and aeronautical networks, and the like.

Figure 6:
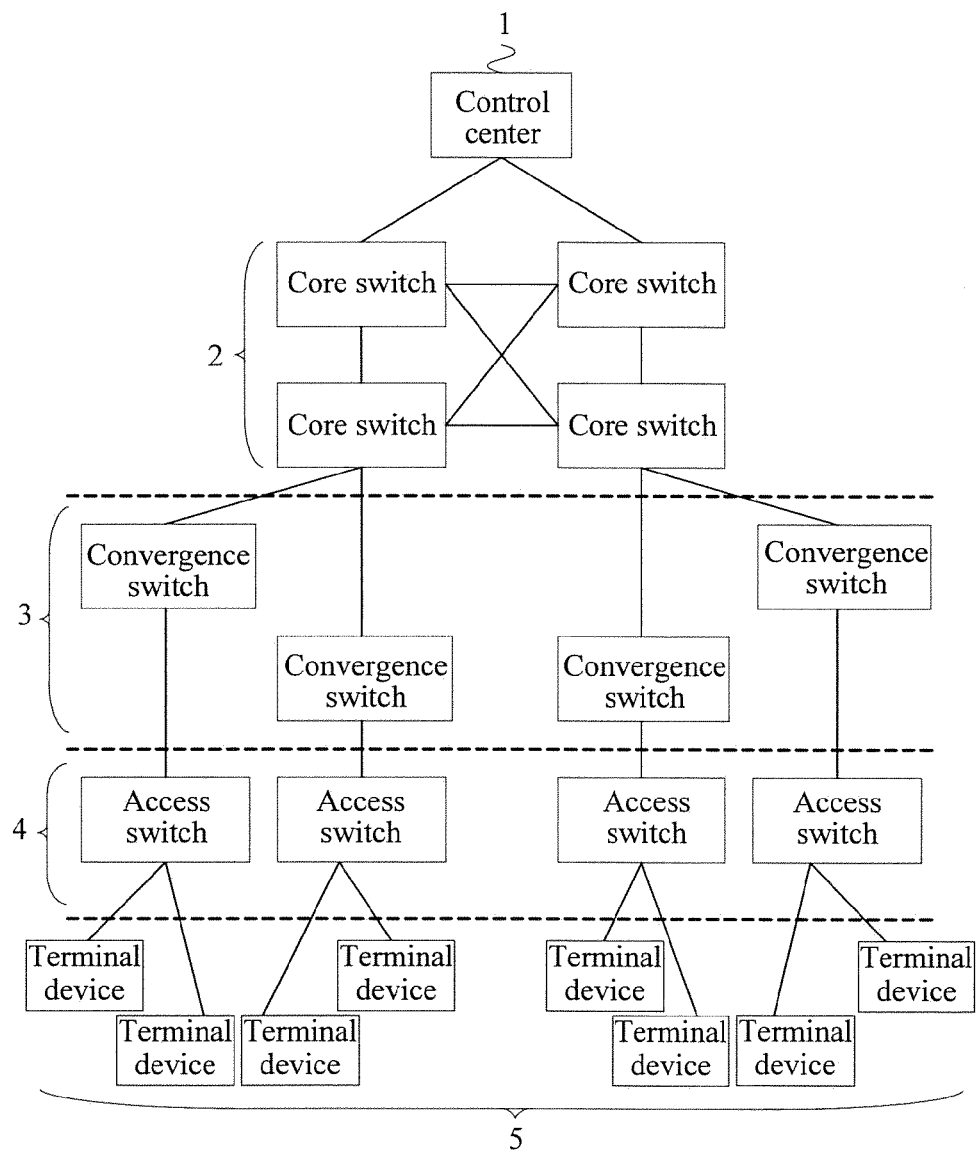
FIG. 6 is a schematic structural diagram of a precise time synchronization communications system based on the IEEE 1588V2 time synchronization protocol according to Embodiment 4 of the present patent application.

The following uses specific embodiments to describe the communications system of the network node described in the foregoing embodiments. FIG. 6 is a schematic structural diagram of a precise time synchronization communications system based on the IEEE 1588V2 time synchronization protocol according to Embodiment 4 of the present patent application. As shown in FIG. 6, the network node of the present patent application may be applied in a time synchronization system that requires a precise timestamp, for example, the precise time synchronization communications system based on the IEEE 1588V2 time synchronization protocol. As shown in FIG. 6, the precise time synchronization communications system includes a control center 1, a core switch 2, a convergence switch 3, an access switch 4, and a terminal device 5. The precise time synchronization communications system implements time synchronization between network nodes, and time synchronization of the entire network system. The control center 1 serves as a master clock providing end and generates a precise timestamp, and the timestamp is carried in a PTP data packet and transmitted to network nodes, such as the core switch 2, the convergence switch 3, and the access switch 4 shown in FIG. 6. Each network node enables, by using each module in the foregoing embodiment according to received precise timestamp information and the PTP data packet, a local time (clock) to precisely synchronize with a master clock time (clock). The core switch 2, the convergence switch 3, and the access switch 1 that serve as intermediate nodes record precise time points at which the packet enters and leaves the local node and generate precise timestamp information. By using the foregoing embodiment, a delay generated by each network node in physical layer processing and MAC layer processing may be effectively avoided; each network node in the communications network supports generation of a high-precision timestamp, so that the entire communications system can implement high-precision time synchronization.

Figure 7:
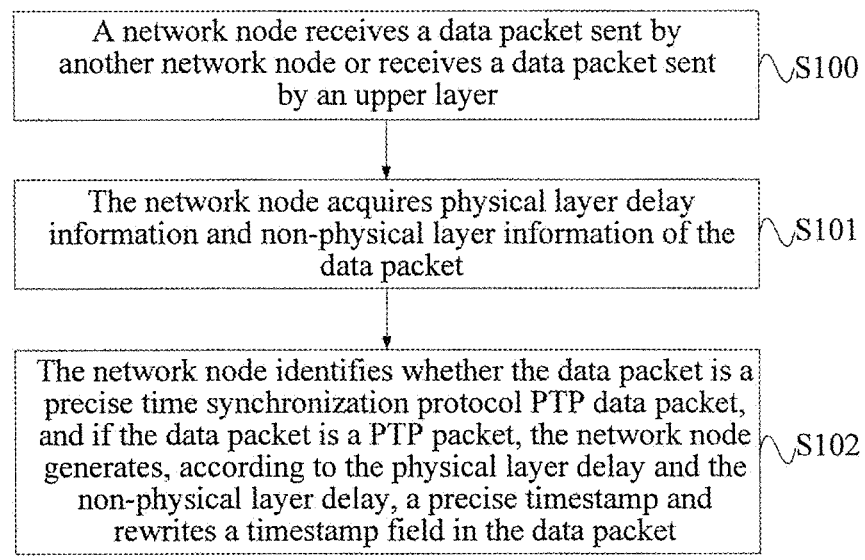
FIG. 7 is a schematic flowchart of a method for generating a timestamp according to Embodiment 5 of the present patent application.

FIG. 7 is a schematic flowchart of a method for generating a timestamp according to Embodiment 5 of the present patent application. As shown in FIG. 6, the method includes the following steps:

S100. A network node receives a data packet sent by another network node or receives a data packet sent by an upper layer.

Specifically, in this embodiment, the network node may serve as a receiving node and receives a data packet sent by another network node, or may serve as a sending node and sends a data packet to another network node. When serving as a sending node, a physical layer of the network node first needs to receive a data packet that is sent by the upper layer, such as a MAC layer, an OS layer, or an application layer, of the network node and needs to be sent to another network node.

S101. The network node acquires physical layer delay information and non-physical layer delay information of the data packet.

Specifically, that the network node acquires physical layer delay information and non-physical layer delay information of the data packet may be: acquiring the physical layer delay information by disposing a physical layer delay acquiring unit at the physical layer and performing measurement on the physical layer; similarly, acquiring the non-physical layer delay information by disposing a non-physical layer delay acquiring unit at a non-physical layer. For a detailed solution, refer to each embodiment of the network node of the present patent application, and details are not described herein again.

S102. The network node identifies whether the data packet is a precise time synchronization protocol PTP data packet, and if the data packet is a PTP data packet, the network node generates, according to the physical layer delay and the non-physical layer delay, a precise timestamp and rewrites a timestamp field in the data packet.

The network node provided in the embodiment of the present patent application receives, by using the network node, a data packet sent by another network node, or receives a data packet sent by an upper layer of the network node. The network node acquires physical layer delay information and non-physical layer delay information of the data packet. The network node identifies whether the data packet is a precise time synchronization protocol PTP data packet, and if the data packet is a PTP data packet, the network node generates, according to the physical layer delay and the non-physical layer delay, a precise timestamp and rewrites a timestamp field in the data packet, so that compensation for the timestamp is implemented according to a physical layer receiving delay and delay information of PTP data packet identification, which effectively improves precision of the timestamp, and improves time synchronization precision of an entire communications network.

Further, when the network node serves as a sending node, S100 in FIG. 7 specifically includes:

the network node receives the data packet sent by the upper layer, the physical layer delay information acquired by the network node is historical physical layer delay information, and the non-physical layer delay information that is acquired by the network node and is between a time point at which the data packet passes through a physical layer-non-physical layer interface and a time point at which the precise timestamp is generated in the network node is historical non-physical layer delay information; and the network node predicts and generates, according to the historical physical layer delay information and the historical non-physical layer delay information, the precise timestamp and rewrites the timestamp field in the data packet.

It should be noted that, a delay generated by a data packet transmitted prior to the PTP data packet when the data packet passes through the physical layer of the network node has smoothness, that is, there is a relatively slight difference between delays corresponding to different data packets. Therefore, the physical layer delay information of the PTP data packet may be acquired according to delay information of a data packet transmitted prior to the PTP data packet, that is, the historical physical layer delay information. Specifically, the physical layer delay information of the PTP data packet may be acquired by using two types of information: delay information of a last data packet transmitted prior to the PTP data packet; or, information about an average delay of all data packets transmitted prior to the PTP data packet. Similarly, in a scenario in which the network node serves as a sending node, the network node acquires the non-physical layer delay information between the time point at which the data packet passes through the physical layer-non-physical layer interface and the time point at which the precise timestamp is generated in the data packet processing unit 12, or may acquire non-physical layer delay information of a data packet transmitted prior to the PTP data packet, that is, the historical non-physical layer delay information. Further, for the foregoing embodiment, the physical layer delay information includes at least one of the following types of delay information: fixed delay information, information about a dynamic fine-grained delay caused by a mismatch between a recovery clock and a local clock, code group alignment delay information, storage module read/write delay information, and data rate matching module delay information. Specific meanings thereof have been described in detail in the foregoing, and details are not described herein again.

The non-physical layer delay information is a delay between the time point at which the data packet passes through the physical layer-non-physical layer interface and the time point at which the precise timestamp is generated in the network node, and includes at least one of the following types of delay information of the data packet at a non-physical layer: processing delay information, queue delay information, and information about a phase difference delay caused by a clock domain difference.

For the foregoing embodiment, functions of S101 and S102 in FIG. 7 are implemented at an MAC layer or a queue area connected to the MAC, where the queue area connected to the MAC is a buffer register operation area, such as a buffer or a register in the network node, that is connected to the MAC.

Further, the following describes, by using specific embodiments, the two cases in which the network node serves as a receiving node and a sending node respectively.

When the network node serves as a receiving node and receives a data packet sent by another network node, physical layer delay information of the network node includes delay information of each piece of data in a data packet received at the physical layer; the network node identifies a precise time synchronization protocol PTP data packet in the data packet, and acquires non-physical layer delay information of the identified PTP data packet; the network node generates a precise timestamp of the PTP data packet according to the physical layer delay information and the non-physical layer delay information, and writes the precise timestamp into the PTP data packet.

For details, refer to the technical solution provided in the foregoing FIG. 3, and details are not described herein again.

If the data packet received by the physical layer is sent by another network node on the network, that the network node generates a precise timestamp of the PTP data packet according to the physical layer delay information and the non-physical layer delay information is specifically:

the network node generates the precise timestamp of the PTP data packet according to PTP acknowledgement indication information generated in the data packet identification process, the physical layer delay information, and the non-physical layer delay information.

When the network node serves as a sending node and sends a data packet to another network node, physical layer delay information of the network node includes delay information of each piece of data in a data packet received at the physical layer.

If the data packet received by the physical layer is sent by the media access MAC layer on the network, that the network node generates a precise timestamp of the PTP data packet according to the physical layer delay information and the non-physical layer delay information is specifically:

the network node generates the precise timestamp of the PTP data packet according to PTP acknowledgement indication information generated in the data packet identification process, the physical layer delay information, and the non-physical layer delay information.

For details, refer to the technical solution provided in the foregoing FIG. 5, and details are not described herein again.

Persons of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present patent application, but not for limiting the present patent application. Although the present patent application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present patent application.

What is claimed is:

1. A network node, comprising: a physical layer transceiver unit, a data packet processing unit, a physical layer delay acquiring unit, and a non-physical layer delay acquiring unit, wherein:

the physical layer transceiver unit is configured to send a data packet to the data packet processing unit;

the data packet processing unit is configured to receive the data packet sent by the physical layer transceiver unit or a data packet sent by an upper layer, and identify whether the data packet is a precise time synchronization protocol (PTP) data packet, and if the data packet is a PTP data packet, the data packet processing unit generates, according to physical layer delay information provided by the physical layer delay acquiring unit, and non-physical layer delay information provided by the non-physical layer delay acquiring unit, a precise timestamp and rewrites a timestamp field in the data packet;

the physical layer delay acquiring unit is configured to acquire the physical layer delay information of the data packet that is generated when the data packet passes through the physical layer transceiver unit, and provide the physical layer delay information to the data packet processing unit; and the non-physical layer delay acquiring unit is configured to acquire the non-physical layer delay information between a time point at which the data packet passes through a physical layer-non-physical layer interface and a time point at which the precise timestamp is generated in the data packet processing unit, and provide the non-physical layer delay information to the data packet processing unit.

2. The network node according to claim 1, wherein the data packet processing unit comprises:

a data packet identification subunit configured to receive the data packet sent by the physical layer transceiver unit or the upper layer, and identify whether the data packet is a PTP data packet; and a timestamp generating and rewriting subunit configured to generate, according to the physical layer delay acquiring unit and the non-physical layer delay acquiring unit, the precise timestamp and rewrite the timestamp field in the data packet when the data packet identification subunit identifies that the data packet is a PTP data packet.

3. The network node according to claim 2, wherein:

the data packet identification subunit is configured to receive the data packet sent by the upper layer, the physical layer delay information of the data packet that is generated when the data packet passes through the physical layer transceiver unit and is acquired by the physical layer delay acquiring unit is historical physical layer delay information, and a non-physical layer delay that is acquired by the non-physical layer delay acquiring unit and is between the time point at which the data packet passes through the physical layer-non-physical layer interface and the time point at which the precise timestamp is generated in the data packet processing unit is historical non-physical layer delay information, wherein the historical physical layer delay information is physical layer delay information of a data packet transmitted prior to the data packet, and the historical non-physical layer delay information is non-physical layer delay information of a data packet transmitted prior to the data packet; and the timestamp generating and rewriting subunit is configured to predict and generate, according to the historical physical layer delay information acquired by the physical layer delay acquiring unit and the historical non-physical layer delay information acquired by the non-physical layer delay acquiring unit, the precise timestamp and rewrite the timestamp field in the data packet.

4. The network node according to claim 1, wherein the physical layer delay information of the data packet that is generated when the data packet passes through the physical layer transceiver unit and is acquired by the physical layer delay acquiring unit comprises at least one of the following types of delay information:

fixed delay information, information about a dynamic fine-grained delay caused by a mismatch between a recovery clock and a local clock, code group alignment delay information, storage module read/write delay information, and data rate matching module delay information.

5. The network node according to claim 1, wherein the non-physical layer delay information that is acquired by the non-physical layer delay acquiring unit and is between the time point at which the data packet passes through the physical layer-non-physical layer interface and the time point at which the timestamp is generated in the data packet processing unit comprises at least one of the following types of delay information of the data packet at a non-physical layer:

processing delay information, queue delay information, and information about a phase difference delay caused by a clock domain difference.

6. The network node according to claim 1, wherein the data packet processing unit is located at a medium access control (MAC) layer or a queue area connected to the MAC layer.

7. A method for generating a timestamp, the method comprising:

receiving, by a network node, a data packet sent by another network node or a data packet sent by an upper layer of the network node;

acquiring, by the network node, physical layer delay information and non-physical layer delay information of the data packet; and identifying, by the network node, whether the data packet is a precise time synchronization protocol (PTP) data packet, and if the data packet is a PTP data packet, generating, according to the physical layer delay and the non-physical layer delay, a precise timestamp and rewriting a timestamp field in the data packet.

8. The method according to claim 7, wherein:

receiving, by a network node, a data packet sent by another network node or receiving a data packet sent by an upper layer of the network node comprises:

receiving, by the network node, the data packet sent by the upper layer, wherein the physical layer delay information of the data packet acquired by the network node is historical physical layer delay information, and the non-physical layer delay information that is acquired by the network node and is between a time point at which the data packet passes through a physical layer-non-physical layer interface and a time point at which the precise timestamp is generated in the network node is historical non-physical layer delay information, wherein the historical physical layer delay information is physical layer delay information of a data packet transmitted prior to the data packet, and the historical non-physical layer delay information is non-physical layer delay information of a data packet transmitted prior to the data packet; and generating, by the network node according to the physical layer delay and the non-physical layer delay, a precise timestamp and rewriting a timestamp field in the data packet comprises:

predicting and generating, according to the historical physical layer delay information and the historical non-physical layer delay information, the precise timestamp and rewriting the timestamp field in the data packet.

9. The method according to claim 7, wherein:

the physical layer delay information comprises at least one of the following types of delay information: fixed delay information, information about a dynamic fine-grained delay caused by a mismatch between a recovery clock and a local clock, code group alignment delay information, storage module read/write delay information, and data rate matching module delay information; and the non-physical layer delay information is delay information between the time point at which the data packet passes through the physical layer-non-physical layer interface and the time point at which the precise timestamp is generated in the network node, and comprises at least one of the following types of delay information of the data packet at a non-physical layer: processing delay information, queue delay information, and information about a phase difference delay caused by a clock domain difference.

10. A communications system, comprising:

a network node, comprising, a physical layer transceiver unit, a data packet processing unit, a physical layer delay acquiring unit, and a non-physical layer delay acquiring unit, wherein:

the physical layer transceiver unit is configured to send a data packet to the data packet processing unit;

the data packet processing unit is configured to receive the data packet sent by the physical layer transceiver unit or a data packet sent by an upper layer, and identify whether the data packet is a precise time synchronization protocol (PTP) data packet, and if the data packet is a PTP data packet, the data packet processing unit generates, according to physical layer delay information provided by the physical layer delay acquiring unit, and non-physical layer delay information provided by the non-physical layer delay acquiring unit, a precise timestamp and rewrites a timestamp field in the data packet;

the physical layer delay acquiring unit is configured to acquire the physical layer delay information of the data packet that is generated when the data packet passes through the physical layer transceiver unit, and provide the physical layer delay information to the data packet processing unit; and the non-physical layer delay acquiring unit is configured to acquire the non-physical layer delay information between a time point at which the data packet passes through a physical layer-non-physical layer interface and a time point at which the precise timestamp is generated in the data packet processing unit, and provide the non-physical layer delay information to the data packet processing unit.

11. The communications system according to claim 10, wherein the data packet processing unit comprises:
a data packet identification subunit configured to receive the data packet sent by the physical layer transceiver unit or the upper layer, and identify whether the data packet is a PTP data packet; and
a timestamp generating and rewriting subunit configured to generate, according to the physical layer delay acquiring unit and the non-physical layer delay acquiring unit, the precise timestamp and rewrite the timestamp field in the data packet when the data packet identification subunit identifies that the data packet is a PTP data packet.

12. The communications system according to claim 11, wherein:
the data packet identification subunit receives the data packet sent by the upper layer, the physical layer delay information of the data packet that is generated when the data packet passes through the physical layer transceiver unit and is acquired by the physical layer delay acquiring unit is historical physical layer delay information, and a non-physical layer delay that is acquired by the non-physical layer delay acquiring unit and is between the time point at which the data packet passes through the physical layer-non-physical layer interface and the time point at which the precise timestamp is generated in the data packet processing unit is historical non-physical layer delay information, wherein the historical physical layer delay information is physical layer delay information of a data packet transmitted prior to the data packet, and the historical non-physical layer delay information is non-physical layer delay information of a data packet transmitted prior to the data packet; and the timestamp generating and rewriting subunit is configured to predict and generate, according to the historical physical layer delay information acquired by the physical layer delay acquiring unit and the historical non-physical layer delay information acquired by the non-physical layer delay acquiring unit, the precise timestamp and rewrite the timestamp field in the data packet.

13. The communications system according to claim 10, wherein the physical layer delay information of the data packet that is generated when the data packet passes through the physical layer transceiver unit and is acquired by the physical layer delay acquiring unit comprises at least one of the following types of delay information:
fixed delay information, information about a dynamic fine-grained delay caused by a mismatch between a recovery clock and a local clock, code group alignment delay information, storage module read/write delay information, and data rate matching module delay information.

14. The communications system according to claim 10, wherein the non-physical layer delay information that is acquired by the non-physical layer delay acquiring unit and is between the time point at which the data packet passes through the physical layer-non-physical layer interface and the time point at which the timestamp is generated in the data packet processing unit comprises at least one of the following types of delay information of the data packet at a non-physical layer:
processing delay information, queue delay information, and information about a phase difference delay caused by a clock domain difference.

15. The communications system according to claim 10, wherein the data packet processing unit is located at a medium access control (MAC) layer or a queue area connected to the MAC layer.

* * * * *